US010953946B2

(12) United States Patent
Raffaelli (10) Patent No.: US 10,953,946 B2
(45) Date of Patent: Mar. 23, 2021

(54) FORECARRIAGE OF A ROLLING MOTOR VEHICLE WITH ROLLING BLOCK (71) Applicant: PIAGGIO & C. S.p.A., Pisa (IT)

(72) Inventor: Andrea Raffaelli, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 54 days.

(21) Appl. No.: 16/472,299

(22) PCT Filed: Dec. 20, 2017

(86) PCT No.: PCT/IB2017/058221
§ 371 (c)(1),
(2) Date: Jun. 21, 2019

(87) PCT Pub. No.: WO2018/116212
PCT Pub. Date: Jun. 28, 2018

(65) Prior Publication Data
US 2019/0382070 A1    Dec. 19, 2019

(30) Foreign Application Priority Data
Dec. 21, 2016    (IT) .................. 102016000129497

(51) Int. Cl.
B62K 5/10    (2013.01)
B62K 5/01    (2013.01)
(Continued)

(52) U.S. Cl.
CPC .................. B62K 5/10 (2013.01); B62K 5/01 (2013.01); B62K 5/05 (2013.01); B62K 5/08 (2013.01)

(58) Field of Classification Search
CPC ... B62K 5/10; B62K 5/01; B62K 5/05; B62K 5/08; B62K 5/027
See application file for complete search history.

(56) References Cited

U.S. PATENT DOCUMENTS 9,211,773 B2 * 12/2015 Kitamura ................. B62K 5/05
9,238,494 B2 *  1/2016 Iizuka ...................... B62K 5/08
(Continued)

FOREIGN PATENT DOCUMENTS

CN        201670311 U     12/2010
EP        2345576 A1       7/2011
(Continued)

OTHER PUBLICATIONS

International Search Report for corresponding application PCT/IB2017/058219 filed Dec. 20, 2017; dated Apr. 9, 2018.
(Continued)

Primary Examiner — Darlene P Condra
(74) Attorney, Agent, or Firm — Cantor Colburn LLP (57) ABSTRACT The present invention relates to a forecarriage of a rolling motor vehicle with three or four wheels, comprising: a forecarriage frame (16); at least one pair of front wheels (10'), (10") kinematically connected to each other and to the forecarriage frame by a kinematic roll mechanism (20) which enables the same to roll in a synchronous and specular manner; an anti-roll system (100) comprising a rod (110) having a first (111) and a second end (112) opposite each other which connect by means of hinging means (101', 101"; 102', 102") a first (60) and a second anchoring portion (60) of forecarriage 8 directly to each other. At least one of said first and second anchoring portions is subject to roll movements of said two front wheels. The hinging means are configured to passively follow the movements of the two anchoring portions. The hinging means (101', 101") at the first end of the rod comprise at least a first roll hinge (101') which has its hinge axis substantially orthogonal to a rolling plane of the two front wheels and is connected to the first anchoring portion. The anti-roll system comprises a first blocking device suitable to reversibly block a rotation angle (Continued)

a of the rod with respect to the first roll hinge at the first end (111).

17 Claims, 6 Drawing Sheets

(51) Int. Cl.
  *B62K 5/05* (2013.01)
  *B62K 5/08* (2006.01)

(56) References Cited

U.S. PATENT DOCUMENTS

| | | | | |
|---|---|---|---|---|
| 2013/0161919 | A1* | 6/2013 | Gaillard-Groleas ... | B60G 99/00 |
| | | | | 280/124.103 |
| 2018/0086168 | A1* | 3/2018 | Iguchi .................... | B62K 5/027 |
| 2018/0086169 | A1* | 3/2018 | Iguchi ................ | B60G 17/0162 |
| 2018/0265157 | A1* | 9/2018 | Hara ........................ | B62J 99/00 |
| 2019/0264906 | A1* | 8/2019 | Takahashi ............... | F01K 23/10 |
| 2019/0375262 | A1* | 12/2019 | Raffaelli ................. | B62K 5/08 |
| 2019/0375476 | A1* | 12/2019 | Raffaelli ................. | B62K 5/10 |

FOREIGN PATENT DOCUMENTS

| | | |
|---|---|---|
| EP | 2810861 A1 | 12/2014 |
| EP | 2899107 A1 | 7/2015 |
| FR | 2953184 A1 | 6/2011 |
| WO | 2010054894 A1 | 5/2010 |
| WO | 2015146660 A1 | 10/2015 |
| WO | 2015146679 A1 | 10/2015 |

OTHER PUBLICATIONS

International Search Report for corresponding application PCT/IB2017/058220 filed Dec. 20, 2017; dated Apr. 9, 2018.
International Search Report for corresponding application PCT/IB2017/058221 filed Jun. 28, 2018; dated Apr. 9, 2018.
International Search Report for corresponding application PCT/IB2017/058223 filed Dec. 20, 2017; dated Sep. 4, 2018.
International Search Report for corresponding application PCT/IB2017/058224 filed Dec. 20, 2017; dated Apr. 9, 2018.
Written Opinion for corresponding application PCT/IB2017/058220 filed Dec. 20, 2017; dated Apr. 9, 2018.
Written Opinion for corresponding application PCT/IB2017/058223 filed Dec. 20, 2017; dated Sep. 4, 2018.
Written Opinion for corresponding application PCT/IB2017/058224 filed Dec. 20, 2017; dated Apr. 9, 2018.
Written Opinion of the International Searching Authority for corresponding application PCT/IB2017/058219 filed Dec. 20, 2017; dated Apr. 9, 2018.
Written Opinion for corresponding application PCT/IB2017/058221 filed Jun. 28, 2018; dated Apr. 9, 2018.

* cited by examiner

FORECARRIAGE OF A ROLLING MOTOR VEHICLE WITH ROLLING BLOCK

FIELD OF APPLICATION

The present invention relates to a forecarriage of a rolling motor vehicle with rolling block. In particular, the vehicle according to the invention may be a motor vehicle provided with two steering and rolling wheels at the front and a rear drive wheel with fixed axle at the rear.

BACKGROUND ART

In the field of motor vehicles there is a growing supply of "hybrid" vehicles that combine the characteristics of motorcycles, in terms of handling, with the stability of four-wheeled vehicles.

These "hybrid" vehicles are represented, for example, by three-wheeled motor vehicles provided with two front steering wheels and, by four-wheeled motor vehicles known as QUAD.

More specifically, the above three-wheeled motor vehicles are provided with two steering and rolling (i.e. tilting) wheels at the front and a rear drive wheel with fixed axle at the rear. The rear wheel is intended to provide the drive torque and thus allow traction while the front wheels, paired, are intended to provide the directionality of the vehicle. The paired wheels at the forecarriage in addition to steering can tilt and roll. Due to this solution, compared to three-wheeled motor vehicles of which two at the rear, the motor vehicles with two wheels at the forecarriage are equivalent to an actual motorcycle since, just like a motorcycle, the motor vehicle can tilt on bends. Compared to a two-wheeled motor vehicle, such vehicles with two paired wheels at the forecarriage have, however, increased stability ensured by the double support on the ground of the front wheels, similar to that provided by a car.

The front wheels are kinematically connected together by means of kinematic mechanisms that enable the same to roll in a synchronous and specular manner, for example through the interposition of articulated quadrilaterals. These vehicles are further provided with two independent suspensions, one for each of the two front wheels, provided with dampers, also independent.

Three-wheel rolling motor vehicles are therefore designed to provide the handling of a two-wheeled motorcycle and, at the same time, the stability and safety of a motor vehicle with four wheels.

A three-wheeled rolling motor vehicle of this type is described, for example, in the Italian patent application no. IT2003MIA001108 by the same Applicant.

Due to the structural features of this type of vehicles, it is possible that under certain conditions, for example at very low speeds or during stops, the motor vehicle may fall as a result of an accidental and/or uncontrolled roll movement.

This problem has been addressed by providing the above vehicles with rolling block systems, operated by the user manually and/or by an automatic control system.

The roll block can be obtained in a variety of ways, but all substantially sharing the reversible block of a component that is configured to follow the rolling movements of one or both rolling wheels. The blocking of the rolling movements of such a component determines kinematically, directly or indirectly, the blocking of the rolling of the two front wheels of the motor vehicle.

The component to be reversibly blocked can be an element that is already present in the rolling structure of the motor vehicle. For example, according to a very popular solution, the component to be blocked can be an element of the articulated quadrilateral that defines the rolling kinematic mechanism, preferably one of the two uprights. The blocking of the movement of an upright of the quadrilateral prevents the latter from varying its configuration and, therefore, indirectly the two wheels from rolling. If the articulated quadrilateral is connected to the axle journals of the two rolling wheel through the interposition of the suspensions, the roll movements due to asymmetric spring movements of the dampers are excluded from such a block and they will need to be managed independently.

Such a system is described, for example, in the Italian patent application no. IT2004A000171 by the same Applicant. The anti-roll system is described in relation to a rolling motor vehicle provided with a steering system with articulated quadrilateral structure and two independent front suspensions. The anti-roll system comprises: a mechanical clamp adapted to block the rotation of the upper upright of the articulated quadrilateral around the hinge connecting the upright to the frame; two hydraulic clamps operated simultaneously by an electric motor acting on rods placed in parallel to the dampers to also prevent the roll due to an asymmetrical spring movement of two wheels.

Alternatively, the component to be reversibly blocked to block the roll can consist of an element that is added to the rolling structure of the motor vehicle and is specifically designed for this purpose.

In particular, this additional element may be associated with the articulated quadrilateral, as a reversible blocking element on the configuration of the quadrilateral itself. This solution is described, for example, in the European patent application EP2810861A1, in the French patent FR2953184 and in the European patent EP2345576B1.

Alternatively, this additional element may consist of a direct interconnection element between the axle journals of two rolling wheels, mechanically released from the frame of the motor vehicle. "Axle journal" of a wheel is the mechanical part of the motor vehicle intended to support the rotation pin of the wheel itself and interconnected it kinematically to the suspensions, the steering device and, in the specific case, to the kinematic roll mechanism. The axle journal has no degrees of freedom with respect to the wheel pin and is therefore kinematically integral with the latter. The axle journal may be made integral with the wheel pin or be mechanically constrained thereto to form one piece. This technical solution of roll blocking—as kinematically released from the effects induced by the suspensions—allows blocking all the roll movements by acting only on such an additional element, thus including the roll movements generated by an asymmetrical spring movement of two rolling wheels. Such a technical solution is the object of the Italian patent application no. 102015000088087 by the same Applicant. A particular anti-roll system described in that application consists of an extensible rod that connects at the two ends thereof the two axle journals of the front wheels directly to each other by hinging means equivalent to a ball joint. The roll blocking is achieved by blocking the angle of rotation of the rod on the rolling plane at at least one end thereof by means of a dedicated actuator, such as a band brake or a drum brake. The rod so blocked prevents the rolling movements of the two wheels. "Rolling plane" means a plane transverse to the longitudinal direction or direction of travel of the motor vehicle, and thus incident the centre line plane of the motor vehicle.

Alternatively, the above additional element may consist of a direct interconnection element between the axle journal of one of the two rolling wheels and the frame of the motor vehicle. Such a technical solution is described in the Italian patent application no. 102015000088091 by the same Applicant. In particular, the anti-roll system consists of an extensible rod that connects at the two ends thereof the axle journal of one of the wheels directly to the frame by hinging means equivalent to a ball joint. The roll blocking is achieved by blocking the angle of rotation of the rod with respect to the rolling plane at at least one of the two ends thereof by means of a dedicated actuator, such as a band brake or a drum brake. The rod so blocked prevents the rolling movements of the two wheels. In this case, the rolling movements caused by the asymmetrical spring suspension of both wheels are not blocked, since the springing of the wheel not connected to the frame by the rod is not affected by the rod block itself.

In general, an anti-roll system, based on an interconnection rod that is hinged at its ends by hinging means equivalent to a ball joint and whose angle of rotation on the rolling plane is blockable a at least one end thereof by means of a dedicated actuator has the great advantage compared to other solutions to be easily installed on motor vehicles, and to require per se a limited footprint.

Moreover, such a rod can be extensible or not in length, depending on whether it connects points the distance whereof varies or not during the movements of the motor vehicle (in particular, roll, steering or asymmetric spring suspension). The system can therefore also be easily configured in such a way as to be substantially transparent when driving.

The adoption of belt or drum brakes also allows integrating the actuators directly on the hinging means of the rod, with advantages in terms of ease of installation.

Such a technical solution, however, has the limit of requiring the use of power actuators, having a size sufficient to provide sufficient torque not only to maintain balance in the motor vehicle by blocking the rolling movements thereof, but also to prevent such a balance from being modified by moving all the weight of the motor vehicle on one side. A single actuator must be able to provide torques in the range of 30 kgm. This requires the installation of belt or drum brakes of large size, which effectively annul the space-saving advantage given by the rod. A similar situation would occur also if disc brakes are used.

This limit is also greatly accentuated in case one wants to block the rotation of the rod at both ends to symmetrise the blocking of the roll on the two rolling wheels. In such a case, it would therefore be necessary to install not one, but two actuators, with a doubling of the overall dimensions and costs. A symmetric blocking of the roll is not in itself essential because the two wheels are connected to each other by the kinematic roll mechanism, but it may be suitable to annul the chain of tolerances and elasticity of the components.

A possible alternative to the belt brake or drum brake consists of an extensible strut which in the vicinity of the hinging area diagonally connects the rod to the element to which it is hinged, as described in the already cited Italian patent application no. 102015000088087. The extensible strut is provided with means adapted to block the extension in length thereof. When blocked in length, the strut prevents the rod from rotating. This technical solution, however, requires more complicated installation and does not allow significantly reducing the problem of the overall dimensions.

There is therefore the need to develop a rolling motor vehicle provided with an anti-roll system which, while adopting a rod blockable at one end as a roll blocking element, allows overcoming in whole or in part the limits set forth above.

DISCLOSURE OF THE INVENTION

Therefore, the object of the present invention is to eliminate or at least reduce, the above drawbacks of the prior art by providing a forecarriage of a rolling motor vehicle provided with an anti-roll system that allows combining the simple installation of a rod as a roll blocking element with a small footprint of the system as a whole.

A further object of the present invention is to provide a forecarriage of a rolling motor vehicle provided with an anti-roll system which allows using actuators that are smaller and more cost-effective than those of the prior art.

A further object of the present invention is to provide a forecarriage of a rolling motor vehicle provided with an anti-roll system which allows a non-abrupt blocking of the roll.

A further object of the present invention is to provide a forecarriage of a rolling motor vehicle provided with an anti-roll system which allows making the blocking of the roll of both rolling wheels symmetrical without causing a significant increase in the overall dimensions of the system and relative costs.

A further object of the present invention is to provide a forecarriage of a rolling motor vehicle provided with an anti-roll system that is constructively simple and cost-effective to be made and mount on the vehicle itself.

DESCRIPTION OF THE DRAWINGS

The technical features of the invention can clearly be seen in the content of the claims below, and its advantages will become more readily apparent in the detailed description that follows, made with reference to the accompanying drawings, which illustrate one or more embodiments thereof which are purely exemplary and non-limiting, in which:

Further features and advantages of the present invention will appear more clearly from the following description of preferred non-limiting embodiments thereof, in which.

DETAILED DESCRIPTION

With reference to the above figures, reference numeral 4 globally denotes a motor vehicle according to the present invention.

For the purposes of this invention, it should be noted that the term motor vehicle must be considered in a broad sense, encompassing any motor vehicle having at least three wheels, i.e. two front wheels, as better described below, and at least one rear wheel. Therefore, the definition of motor vehicle also encompasses the so-called quads, with two wheels at the forecarriage and two wheels at the rear.

The motor vehicle 4 comprises a frame 6 extending from a forecarriage 8 supporting at least two front wheels 10, to a rear 12 supporting one or more rear wheels 14. It is possible to distinguish a left front wheel 10' and a right front wheel 10", wherein the definition of left and right wheel 10', 10" is purely formal and means in relation to a driver of the vehicle. Said wheels are arranged to the left and right of a centre line M-M of the motor vehicle, with respect to an observation point of a driver driving the same.

For the purposes of the present invention, frame 6 of the motor vehicle may have any shape, size and may for example be of the lattice type, the box-like type, single or dual cradle and so on. Frame 6 of the motor vehicle may be in one piece or in multiple parts; for example, frame 6 of the motor vehicle is interconnected with a rear frame 13 which may comprise a rear oscillating swingarm (not shown) supporting one or more rear drive wheels 14. The above rear swingarm may be connected to frame 6 by direct hinging, or by the interposition of crank mechanisms and/or intermediate frames.

According to a general embodiment solution of the present invention, the motor vehicle forecarriage 8 comprises a forecarriage frame 16 and a pair of front wheels 10',10" kinematically connected to each other and to the forecarriage frame 16 by means of a kinematic roll mechanism 20 which preferably enables the same to roll in a synchronous and specular manner.

The motor vehicle forecarriage 8 comprises an anti-roll system 100 in turn comprising a rod 110 having a first 111 and a second end 112 opposite each other which connect by means of hinging means 101', 101" and 102', 102" a first anchoring portion 102 and a second anchoring portion 60 of forecarriage 8 directly to each other.

Preferably, at least one of said first 60 and second anchoring portions 60 is subject to roll movements of said two front wheels 10', 10". In particular, as explained in greater detail below:
  said first 60 and second anchoring portions 60 are both subject to roll movements of said two front wheels 10', 10"; or
  only one of said first and second anchoring portions is subject to roll movements of said two front wheels 10',10", while the other anchoring portion is part of the forecarriage frame 16.

Preferably, the above hinging means 101', 101" and 102', 102" are configured to passively follow the movements of said first anchoring portion 60 and said second anchoring portion 60.

Preferably, the hinging means 101', 101" to said first end 111 of the rod comprise at least a first roll hinge 101' which has its hinge axis substantially orthogonal to the rolling plane of the two front wheels 10', 10" and is connected to said first anchoring portion 60.

Said anti-roll system 100 comprises a first blocking device suitable to reversibly block a rotation angle α of said rod 110, preferably with respect to said first roll hinge 101' at the first end 111 of rod 110. Such an angle of rotation α corresponds to the roll angle of rod 110. "Rolling plane" means a plane transverse to the longitudinal direction or direction of travel Y of the motor vehicle, and thus incident the centre line plane M-M of the motor vehicle. Operatively, block the rotation of rod 110 at at least one end thereof with respect to the roll plane means blocking the roll movements of the forecarriage parts connected to rod 110 and thus consequently blocking the roll movements of the two front wheels 10', 10".

According to a preferred embodiment shown in the accompanying Figures, each front wheel 10', 10" is connected to said kinematic roll mechanism 20 by a respective axle journal 60, which is mechanically connected to a rotation pin 68 of the wheel so as to support it rotatably around an axis of rotation. The forecarriage further comprises suspension means to guarantee each axle journal 60 at least one spring suspension movement with respect to said rolling kinematic mechanism 20.

"Axle journal" of a wheel is the mechanical part of the motor vehicle intended to support the rotation pin of the wheel itself and interconnected it kinematically to the suspensions, the steering device and the above kinematic roll mechanism 20. The axle journal can be kinematically integral with the wheel pin, which in turn supports the wheel through bearings. In that case, the axle journal may be made integral with the wheel pin or be mechanically constrained thereto to form one piece. The axle journal can be kinematically integral with the wheel pin, which in turn supports the wheel through bearings.

According to this preferred embodiment illustrated in the accompanying Figures, the above first and second anchoring portions consist of the axle journals 60 of the two front wheels 10', 10" and are therefore both subject to roll movements of said two front wheels 10', 10". In this case, the blocking of the rotation of rod 110 with respect to said rolling plane determines the block of the rolling movements of the axle journals of both two front wheels, and thus directly of the two wheels themselves.

Alternatively, according to an embodiment not illustrated in the accompanying figures, said rod 110 may connect the axle journal of only one of the two front wheels directly to the forecarriage frame 16. In this case, only one of said first and second anchoring portions is subject to the roll movements of said two front wheels 10', 10". In this case, the blocking of the rotation of the rod with respect to said rolling plane occurs only at a front wheel. Operatively, the blocking of the roll of a single front wheel, however, also automatically determines the rolling block of the other front wheel, due to the kinematic interconnection imposed by the above kinematic roll mechanism.

Preferably, in both embodiments, which provide the connection of rod 110, respectively, to one or both axle journals, the hinging means 101', 101" to the first end of the rod also comprise a first cylindrical steering hinge 101" having hinge axis parallel to said rolling plane to allow steering movements to the axle journal. The first roll hinge 101' is connected to said cylindrical steering hinge 101".

The above kinematic roll mechanism 20 may have any configuration provided that preferably it is functional to ensure the front wheels to roll in synchronous and specular manner. According to the embodiment illustrated in the accompanying Figures, the kinematic roll mechanism 20 is an articulated quadrilateral system.

More in detail, such an articulated quadrilateral system comprises a pair of cross members 24', 24", hinged to the forecarriage frame 16 at middle hinges 28. The cross members 24', 24" are connected to each other, at opposite transverse ends by means of uprights 48 pivoted at said transverse ends at side hinges 52. The cross members 24', 24" and uprights 48 define the above articulated quadrilateral 20.

Preferably, in this case, each of the uprights 48 guides and supports an axle journal 60 of one of said front wheels 10', 10".

According to an embodiment not illustrated in the accompanying Figures, each upright can guide and support the axle journal of the respective front wheel coaxially to a prevailing extension axis thereof. In this case, the suspension means of each front wheel are integrated into the respective upright and ensure a rectilinear spring motion of the axle journal along the prevailing extension axis of the upright.

Alternatively, as illustrated in the accompanying Figures, the articulated quadrilateral kinematic roll mechanism 20 can be implemented in such a way that each of the uprights 48 guides and supports the axle journal 60 of the respective front wheel 10', 10" externally to itself via a kinematic connection system of the roto-translational type Advantageously, according to an embodiment not illustrated in the accompanying Figures, when the kinematic roll mechanism is an articulated quadrilateral system, the above first and second anchoring portions may consist of two components selected from the uprights and the cross members of said articulated quadrilateral system and are therefore both subject to rolling movements of said two front wheels 10', 10". Operatively, the blocking of the rotation of rod 110 with respect to the rolling plane determines the blocking of the articulated quadrilateral configuration, and then as a result of the rolling movements that are allowed by such an articulated quadrilateral system.

Alternatively, according to a further embodiment not illustrated in the accompanying figures, said rod 110 may connect a component selected from the uprights and the cross members of said articulated quadrilateral system directly to the forecarriage frame 16. In this case, only one of said first and second anchoring portions is subject to the roll movements of said two front wheels 10', 10".

Preferably, in both the above embodiments, which provide the connection of rod 110, respectively, between two components of the articulated quadrilateral or between one of such components and the forecarriage frame, the hinging means at the first end 111 of rod 110 may simply consist of the first roll hinge 101'. The articulated quadrilateral is in fact always parallel to said rolling plane in all its different configurations and is transparent to the steering movements, such as the forecarriage frame.

Advantageously, forecarriage 8 is provided with a steering device adapted to control the rotation of the axle journals about respective steering axes of each front wheel 10', 10". The steering device may act directly on the axle journals and be subject to the action of the suspensions, or act indirectly on the axle journals without being subject to the action of the suspensions.

According to a first aspect of the invention, as illustrated in the accompanying Figures, said first blocking device comprises a connecting rod-crank kinematic mechanism 210, 220 which is preferably connected to said rod 110, preferably at the connecting rod 210 by means of a first cylindrical hinge 201, and to said first anchoring portion 60, preferably at said crank 220 by means of a second cylindrical hinge 202, so as to define an articulated quadrilateral.

Preferably, the connecting rod 210 is connected to crank 220 by means of a cylindrical articulation hinge 203.

Preferably, the above connecting rod 210 is engaged:

at a first end 210a to the cylindrical articulation hinge 203 or the first cylindrical hinge 201 in an offset position with respect to the respective hinge axis by means of a support bracket 231; and at a second end 210b to the first cylindrical hinge 201 or the cylindrical articulation hinge 203 with an axially mobile coupling.

Preferably, the above first 201 and second cylindrical hinge 202 and the above cylindrical articulation hinge 203 all have a hinge axis parallel to the hinge axis of the first roll hinge 101' and constitute the vertices of said articulated quadrilateral, in which:

two first opposite sides are formed by crank 220 and by the portion of the first end 111 of rod 110 comprised between the first roll hinge 101' and the first cylindrical hinge 201; and the other two opposite sides are formed directly by the first anchoring portion (or by the cylindrical steering hinge 101" which is connected to the first anchoring portion 60, as illustrated in the accompanying figures) and by the assembly formed by the support bracket 231 and the connecting rod 210.

Figure 1:
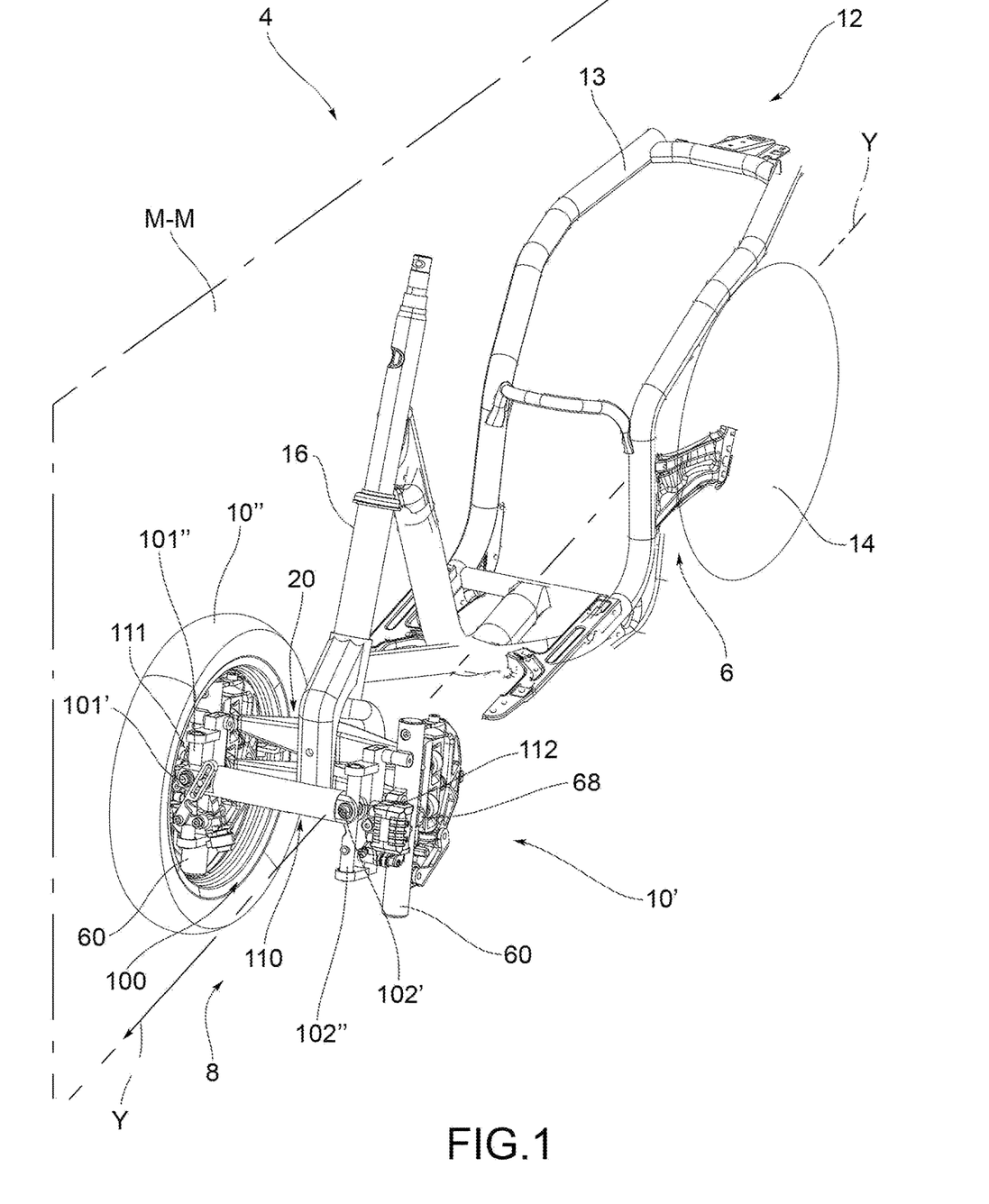
FIG. 1 shows a perspective view of a motor vehicle provided with a forecarriage with roll blocking system according to preferred embodiment of the invention, illustrated with some parts removed to better show others.
Figure 2:
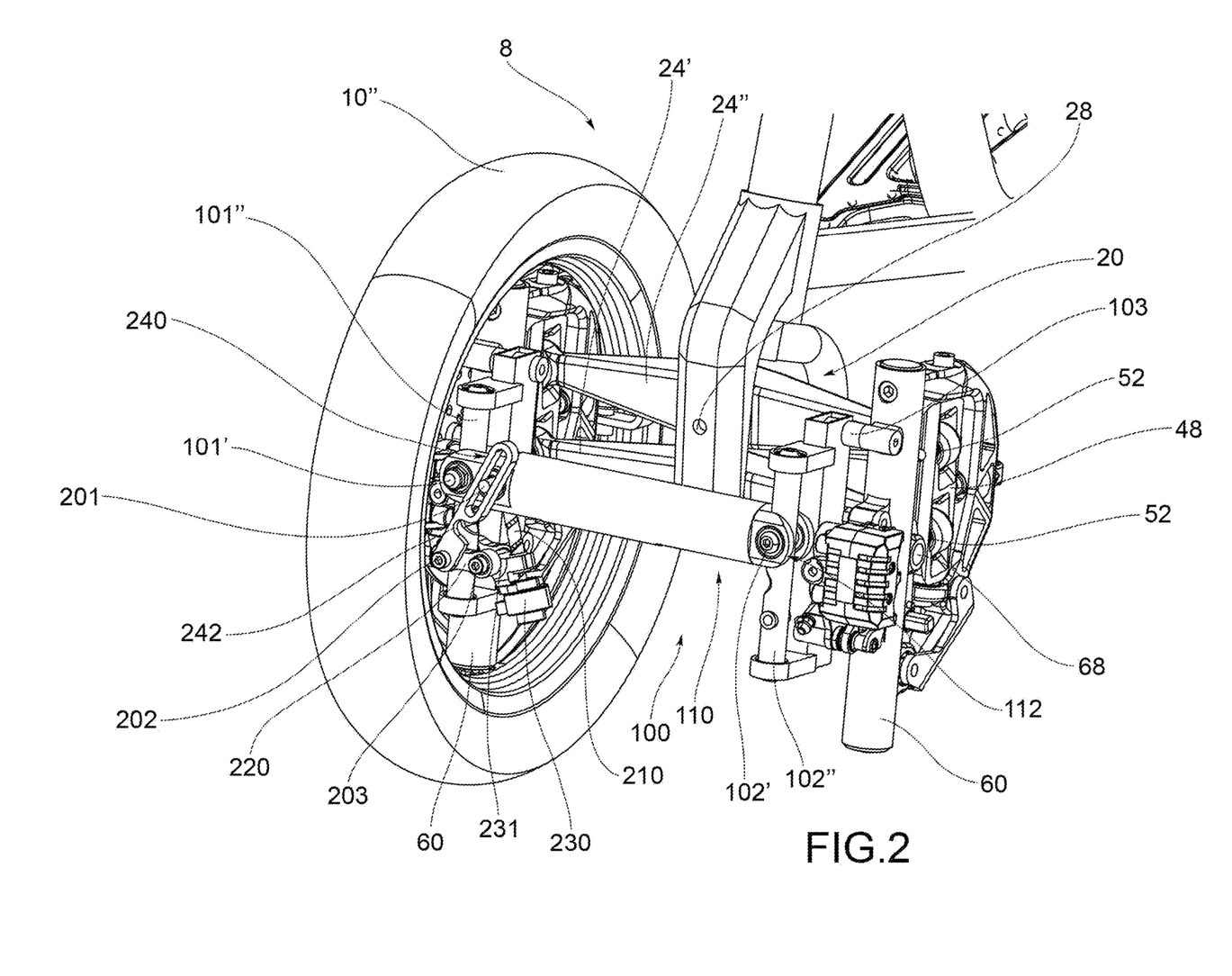
FIG. 2 shows an enlarged view of the forecarriage of the motor vehicle shown in FIG. 1.
Figure 3:
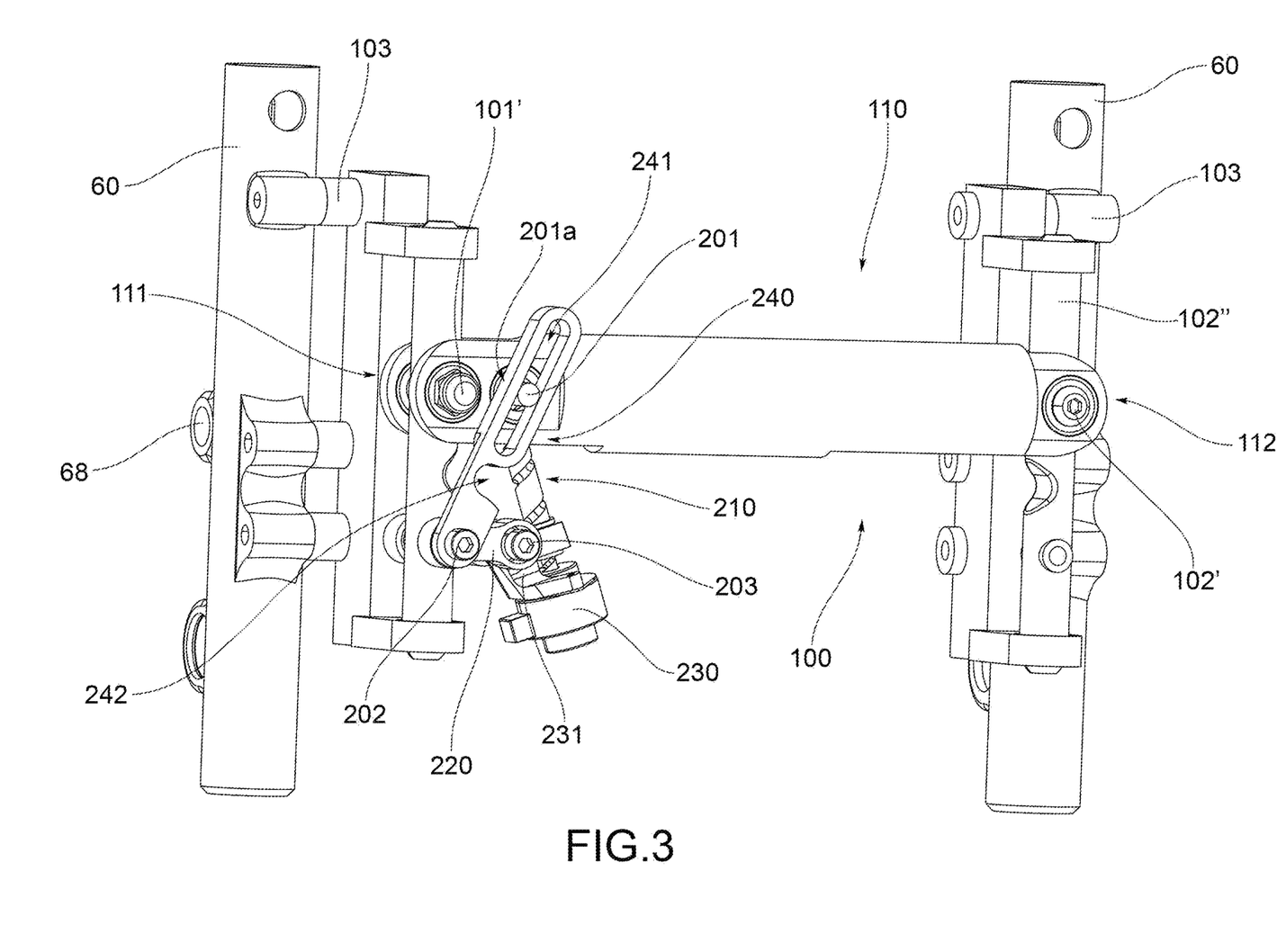
FIG. 3 shows an enlarged perspective view of a detail of the forecarriage of the motor vehicle in FIG. 1, relating to an anti-roll system, illustrated separated from the forecarriage and with a blocking device in the free configuration.
Figure 4:
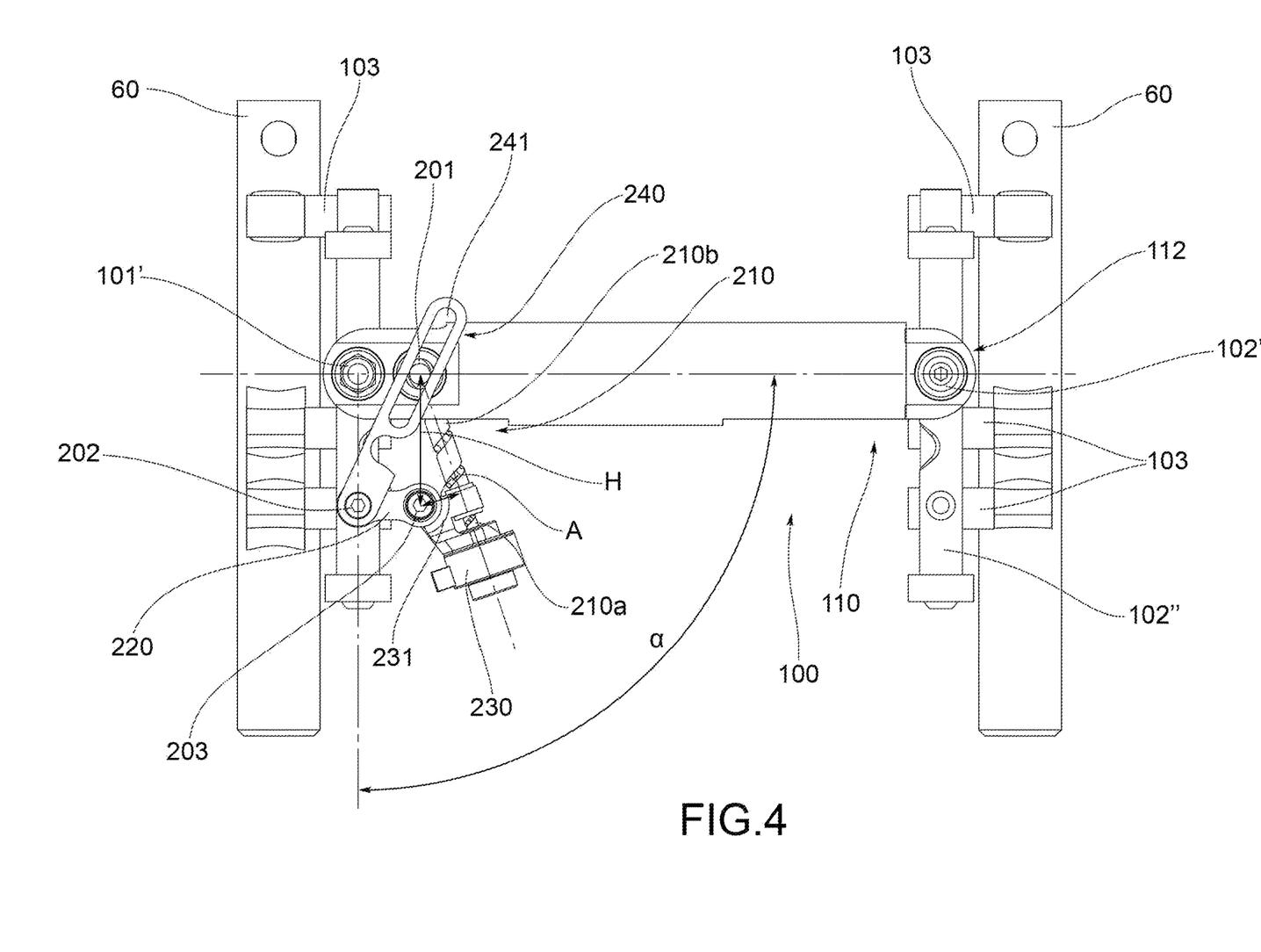
FIG. 4 shows a front orthogonal view of the detail shown in FIG. 3.
Figure 5:
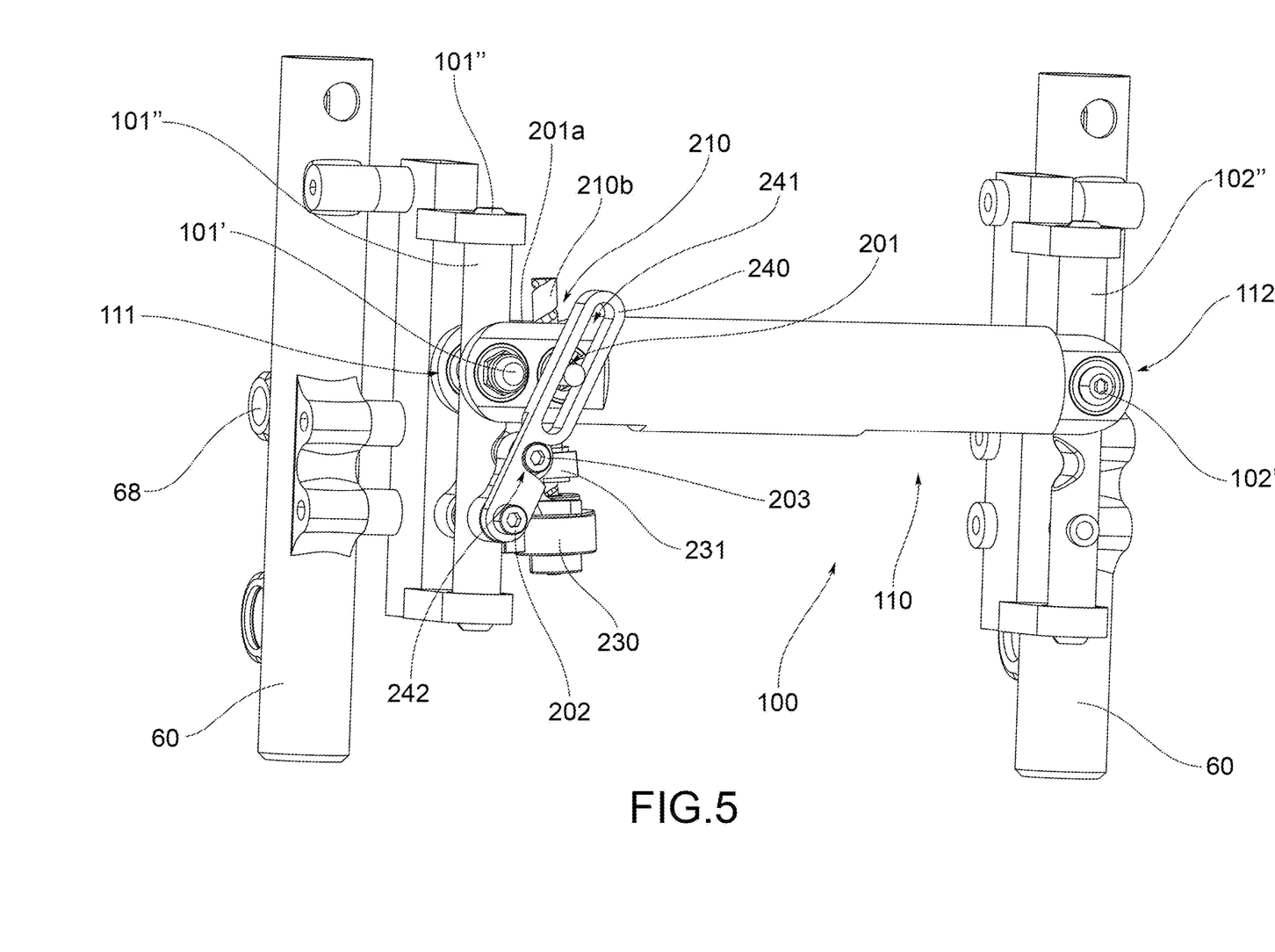
FIG. 5 shows a perspective view of the anti-roll system in FIG. 3, shown with the blocking device in a blocked configuration.
Figure 6:
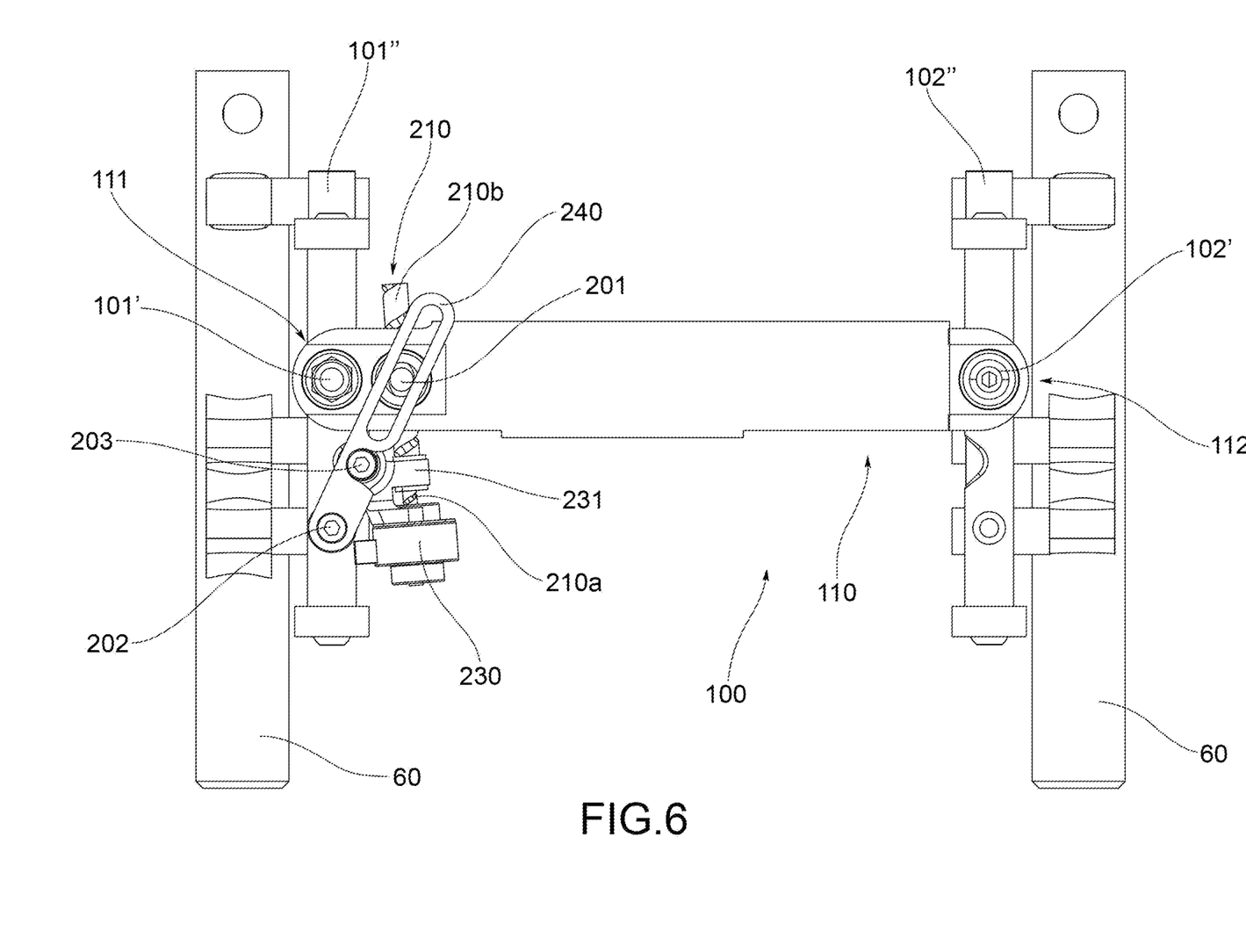
FIG. 6 shows a front orthogonal view of the detail shown in FIG. 5.

Functionally, the above articulated quadrilateral varies its configuration as the roll angle α of the first end 111 of rod 110 varies due to rolling movements of the two front wheels. According to another aspect of the invention, the above first blocking device comprises an actuator 230 which is suitable to impart a shift movement to said connecting rod-crank kinematic mechanism so as to vary the configuration of said connecting rod-crank kinematic mechanism 210, 220 between:

a blocked configuration, in which the articulated quadrilateral is substantially degenerated into a triangle, thus defining a blocking strut of the roll angle α of the rod (as illustrated in FIGS. 5 and 6); and at least one free configuration, in which the articulated quadrilateral has a non-degenerate configuration which leaves the rolling movements free (as illustrated in FIGS. 3 and 4). Preferably, the actuator 230 is suitable to impart an axial shift movement to the connecting rod 210 relative to the above first cylindrical hinge 201 or the above cylindrical articulation hinge 203 to vary the distance H defined between the first cylindrical articulation hinge 203 and the first cylindrical hinge 201.

Operatively, the above actuator 230 can be operated to vary such a distance H by rotating crank 220 around the second cylindrical hinge 202 and keeping the connecting rod 210 out of alignment with respect to the axis between the cylindrical articulation hinge 203 and the second cylindrical hinge 202 so as to vary the configuration of said crank-connecting rod kinematic mechanism 210, 220 between:

a blocked configuration, in which crank 220 is aligned with respect to a blocking axis passing between the first cylindrical hinge 201 and the second cylindrical hinge 202 and said articulated quadrilateral is substantially degenerated into a triangle, thus defining a blocking strut of the roll angle α of the rod (as illustrated in FIGS. 5 and 6); and at least one free configuration, in which crank 220 is misaligned with respect to said blocking axis and said articulated quadrilateral has a non-degenerate configuration which leaves the rolling movements free (as illustrated in FIGS. 3 and 4).

Due to the invention, the blocking of the roll at the first end 111 of rod 110, that is, in other words the application of a torque suitable to prevent variations in the roll angle α around the first roll hinge 101', is not entrusted to actuator 230 but to the connecting rod-crank kinematic mechanism 210, 220.

The function of actuator 230 is only to impart a shift movement to said connecting rod-crank kinematic mechanism, and in particular to change the distance H, and thus cause the rotation of crank 220 around the second hinge 202, so as to degenerate the articulated quadrilateral into a triangle, thus defining a blocking strut.

Actuator 230 must be able to provide sufficient power to overcome the friction of the hinges, but not to carry out the actual blocking action.

The roll blocking action is instead achieved by means of a static mechanical constraint, which creates a situation of kinematic incompatibility with the movements of rotation of rod 110 around the first roll hinge 101'. To ensure an effective blocking of the roll it is therefore sufficient to statically size the components of the connecting rod-crank kinematic mechanism 210, 220 in such a way that they are able to withstand the blocking torque of the roll.

It is estimated that on average, a system of this type must withstand a torque of about 22 kgm, corresponding to a peak load between the connecting rod and the crank of the order of 700 kg. This load mainly acts on the components of the connecting rod-crank kinematic mechanism, affecting in particular the connecting rod. Actuator 230 is not, however, in any way affected by this load being external to the connecting rod-crank system.

This allows adopting actuators of significantly reduced power compared to traditional systems, with a consequent reduction also of the size and dimensions of the actuators themselves.

Advantageously, in order to reduce to a minimum the friction in the hinges, it is possible to implement the hinges using roller bearings.

From the foregoing, the rolling block system according to the invention thus allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

Operatively, as mentioned above, to bring the connecting rod-crank kinematic mechanism 210, 220 to the blocked configuration, actuator 230 is operated so as to impart preferably an axial shift movement to the connecting rod 210 with respect to said cylindrical articulation hinge 203 or with respect to said first cylindrical hinge 201, so as to progressively reduce the distance H. This axial shift takes place while keeping rod 210 misaligned with respect to the axis between the cylindrical articulation hinge 203 and the second cylindrical hinge 202 due to the presence of said support bracket 231.

As a result, crank 220 revolves around the second cylindrical hinge 202 and the articulated quadrilateral progressively deforms. The articulated quadrilateral retains the ability to follow the rolling movements induced on rod 110, while gradually decreasing the width of the rolling oscillations possible around each position. When the crank is aligned with respect to said blocking axis (passing between the first cylindrical hinge 201 and the second cylindrical hinge 202), the system becomes isostatic and blocks, thus preventing the rolling movements of the rod and therefore of the motor vehicle.

Operatively, to bring the connecting rod-crank kinematic mechanism 210, 220 to an unlocked configuration, it is sufficient to operate actuator 230 so that it imparts an inverse axial shift movement to the connecting rod 210 with respect to said cylindrical articulation hinge 203 or with respect to said first cylindrical hinge 201 so as to gradually increase the distance H and determine a counter-rotation of crank 220.

This is made possible by the fact that through said support bracket 231, the connecting rod 210 is always kept out of alignment with respect to the axis between the cylindrical articulation hinge 203 and the second cylindrical hinge 202. As a result, between the cylindrical articulation hinge 203 (or the second cylindrical hinge 202) and the longitudinal axis of the connecting rod 210, an arm A is always defined, which when actuator 230 applies an axial force along the axis of the connecting rod 210 generates a rotation moment on crank 220 around the second cylindrical hinge 202.

Such a kinematic situation occurs with any configuration of the articulated quadrilateral. This ensures that actuator 230 is always able to change the distance H and thus rotate the crank. The block reversibility is therefore always ensured.

From the above description, it appears that the attainment of the blocked configuration is not in fact perceived by actuator 230. Kinematically, if activated, actuator 230 is in fact able to force crank 220 beyond the position corresponding to the blocked configuration, compatibly with the mechanical deformation limits of the connecting rod-crank kinematic mechanism.

To ensure the positioning of the connecting rod-crank system at a position corresponding to said blocked configuration, said first blocking device further comprises stop means 240 suitable to stop the rotation of crank 220, preferably with respect to the second cylindrical hinge 202, in a position corresponding to said blocked configuration in the transition between said free configuration and said blocked configuration.

Preferably, said stop means consist of a mechanical end stroke element 240.

In particular, as illustrated in the accompanying Figures, the above mechanical end stroke consists of a Fairbairn mechanism 240 which diagonally connects the first cylindrical hinge 201 and the second cylindrical hinge 202. In particular, the Fairbairn mechanism has a longitudinal slot 241 in which the first cylindrical hinge is coupled. Slot 241 allows a sliding movement relative to the first cylindrical hinge 201 so as to allow sliding along the axis between said first 201 and second cylindrical hinge 202.

The Fairbairn mechanism 240 defines an engagement seat 242 for the cylindrical articulation hinge 203. Such engagement seat 242 is axially aligned between the first 201 and the second cylindrical hinge 202 and allows the correct positioning of the crank in a position corresponding to said blocked configuration of the connecting rod-crank kinematic mechanism. Due to the Fairbairn mechanism 240, the correct positioning of crank 220 can thus be obtained in a mechanically simple and reliable manner without therefore the need to implement expensive and complex actuator control systems.

According to the embodiment shown in the accompanying Figures, said rod 210 consists of a worm screw which is rotationally meshed on a support body 201a of the first cylindrical hinge 201 or of the cylindrical articulation hinge 203. Actuator 230 is adapted to impart to the worm screw 210 a rotational movement on its axis which determines an axial displacement of the connecting rod 210 with respect to the first cylindrical hinge 201 or to the cylindrical articulation hinge 203.

Preferably, as illustrated in the accompanying Figures, said worm screw 210 is rotationally meshed on the support body 201a of the first cylindrical hinge 201 with the second end portion 210b thereof and is connected to the cylindrical articulation hinge 203 at the first end portion 210a thereof indirectly by means of said support bracket 231, which is configured to keep the worm screw 210 offset with respect to the cylindrical articulation hinge 203. In one embodiment, the worm screw is a recirculating ball screw which reduces the sliding friction. Advantageously, according to the embodiment shown in the accompanying Figures, actuator 230 is supported by the support bracket 231 externally to the articulated quadrilateral and is rotationally engaged with the first end portion 210a of the worm screw 210.

According to an embodiment not illustrated in the accompanying Figures, crank 210 may comprise a damper arranged along the longitudinal axis thereof, adapted to determine a non-abrupt blocking of the roll when the connecting rod-crank kinematic mechanism 210, 220 is brought into the blocked configuration. Functionally, once the blocked configuration has been achieved, oscillations along the blocking axis, i.e. along the crank are still possible due to the presence of the damper. This prevents an abrupt blocking of the roll.

Advantageously, the above anti-roll system 100 comprises stop means of said damper adapted to deactivate the damper, preventing oscillations along the axis of crank 220 and thereby cause a static block. Preferably, such a damper is a bidirectional damper.

According to an embodiment not illustrated in the accompanying Figures, the anti-roll system 100 comprises a second blocking device which is adapted to reversibly block the angle of rotation of rod 110 also at the second end 111 and is identical to the above first blocking device arranged in the first end 111 of rod 110. In this case, the hinging means 102', 102" to said second end 112 of rod 110 comprise a second roll hinge 102' which has its hinge axis substantially orthogonal to the rolling plane of the two front wheels 10', 10" and is connected to the second anchoring portion.

The provision of a first and a second blocking device, respectively, at the first 111 and second end 112 of the rod allows making the blocking of the roll on the two front wheels 10', 10" symmetrical. This applies in particular if rod 110 directly connects the axle journals 60 of the two front wheels 10', 10" to each other.

Advantageously, as illustrated in the accompanying Figures, also if only one blocking system is provided at the first end 111 of the rod, the hinging means 102', 102" at the second end 112 of rod 110 may comprise a second roll hinge 102' which has its hinge axis substantially orthogonal to the rolling plane of the two front wheels 10', 10" and is connected to the second anchoring portion.

Preferably, rod 110 is extensible in the longitudinal direction between said first 111 and second end 112, so as to allow rod 110 to extend in a longitudinal direction along its longitudinal axis X. In particular, rod 110 may be made extensible by providing it with a telescopic structure.

Functionally, the extensibility of rod 110 in the longitudinal direction is necessary if rod 110 connects to each other two parts of the forecarriage whose distance may vary, for example as a result of rolling or steering movements of the wheels. In this case, the longitudinal extensibility is necessary to prevent rod 110 from interfering with the manoeuvrability of the motor vehicle.

This is particularly happens when:
  rod 110 is placed to connect the axle journals of the two front wheels and is connected thereto out of the respective steering axes; or
  rod 110 is placed to connect an upright and a cross member of the articulated quadrilateral kinematic roll mechanism.

Otherwise, if, for example, rod 110 is placed to connect the two uprights of an articulated quadrilateral system of regular shape (such as rectangular), parallel to the two cross members, the rod extensibility is not required. In fact, in this case, the points connected by rod 110 never vary their distance. Similarly, the extensibility is not necessary if the rod connects the two axle journals at the respective steering axes and at the same height with respect to the ground.

Preferably, as already mentioned, if rod 110 is connected to one or both axle journals, the hinging means 101', 101" to the first end of the rod also comprise a cylindrical steering hinge 101" having hinge axis parallel to the rolling plane to allow steering movements to the axle journal.

More in detail, as illustrated in the accompanying Figures, the first roll hinge 101' is connected to said cylindrical steering hinge 101". The connection to the first anchoring portion (which in this case consists of an axle journal 60) is achieved by means of the above steering hinge 101', which in the accompanying figures is anchored to the axle journal 60 via two or more support arms 103. In this case, as illustrated in the accompanying Figures, also the second cylindrical hinge 202 is connected to the above steering hinge 101" to allow the connecting rod-crank kinematic mechanism 210, 220 to follow the steering movements.

An object of the present invention is also a method of reversibly blocking the rolling movements of a motor vehicle with three or four wheels, having a forecarriage 8 according to the present invention and in particular as described above.

The above method comprises, in alternation:
  a roll blocking step, in which the crank 220 is rotated around the second cylindrical hinge 202 as far as said blocked configuration where said stop means 240 intervene, actuating the actuator 240 of at least said first blocking device, degenerating the articulated quadrilateral substantially into a triangle and thus defining a strut blocking the roll angle of the rod; and
  a roll release step, in which the crank 220 is rotated from said blocked configuration as far as said at least one free configuration disengaging the crank 220 from said stop means 240, actuating the actuator 230 of at least said first blocking device, restoring a non-degenerate configuration of said articulated quadrilateral and consequently freeing the roll movements of the two front wheels 10', 10".

Preferably, in the roll blocking step, the crank 220 is rotated around the second cylindrical hinge 202 as far as said blocked configuration where said stop means 240 intervene, actuating the actuator 240 of at least said first blocking device, so as to reduce the distance H defined between the first cylindrical hinge 201 and the cylindrical articulation hinge 203, so as to align crank 220 on the blocking axis defined between the second cylindrical hinge 202 and the first cylindrical hinge 201.

Preferably, in the roll release step, the crank 220 is rotated from said blocked configuration as far as said at least one free configuration disengaging the crank 220 from said stop means 240, actuating the actuator 230 of at least said first blocking device so as to increase the distance H between the first cylindrical hinge 201 and the cylindrical articulation hinge 203, so as to misalign the crank 220 again with respect to said blocking axis.

An object of the present invention is also a motor vehicle 4 having a drive wheel at the rear and a forecarriage 8 according to the present invention and in particular as described above. In further functional aspects, the roll blocking mechanism, according to the present invention, differs from the prior art systems as described below.

The blocking step, but also the opposite, of release, do not have a "transient" step, as occurs in the actuation of a friction brake, such as a mechanical, hydraulic clamp, a belt brake, etc.

In detail, when the pads in a brake come into contact with the disc, a frictional force is generated which increases progressively up to cause the blocking, once a predetermined value has been reached. In other words, the blocking occurs when the load on the pads reaches said predetermined value. For these reasons, we talk about transient that identifies the time interval between the block actuation and the actual mechanical blocking.

In this transient step, therefore, the vehicle is not yet able to determine a static balance condition; at the same time, driving is heavily penalized.

To better explain with reference to a three-wheeled vehicle, the duration of actuation of the electric motor that activates the roll blocking is estimated at about 2 seconds. The vehicle begins to block after only 1 second. This implies that, if due to trajectory requirements the vehicle tilts, the driver feels a greater contrast to his driving input. If the vehicle encounters an obstacle on one side, the suspension may be inactive, or the vehicle may also be rolled on flat road.

In the embodiment described above, a transient condition is not present. The actuator is actuated until the alignment of the hinges occurs; therefore, the quadrilateral is absolutely free because no friction is introduced to the system.

The invention allows several advantages to be achieved, some of them already described.

The rolling block system according to the invention allows combining the simple installation of a rod as a roll blocking element with a small footprint of the system as a whole. It is in fact possible to use actuators having a significantly smaller size than those required by traditional systems. The size reduction of the actuators has as a consequence not only a reduction of the overall dimensions, but also of costs.

The roll blocking system according to the invention allows performing a non-abrupt blocking of the roll in the case in which the crank of the crank-connecting rod system comprises a damper.

In the specific case in which rod 110 is placed to connect the axle journals of the two front wheels 10', 10", the roll blocking system according to the invention can be easily symmetrised on both front wheels 10', 10" by providing a blocking device at both ends of the rod. This does not cause a significant increase in the overall size of the system and the related costs due to the fact that small actuators can be used.

The roll blocking system according to the invention is also constructionally simple and cost-effective to produce and mount on the motor vehicle itself.

According to a preferred embodiment, it is provided a forecarriage 8 of a rolling motor vehicle with three or four wheels, comprising:
- a forecarriage frame 16,
- at least a pair of front wheels 10',10" kinematically connected to each other and to the forecarriage frame 16 by means of a kinematic roll mechanism 20 which enables the same to roll in a synchronous and specular manner,
- an anti-roll 100 system comprising a rod 110 having a first 111 and a second end 112 opposite each other which connect by means of hinging means 101', 101"; 102', 102" a first 60 and second anchoring portion 60 of the forecarriage 8 directly to each other, wherein at least one of said first 60 and second anchoring portions 60 is subject to roll movements of said two front wheels 10', 10", said hinging means 101', 101"; 102', 102" being configured to passively follow the movements of said first and second anchoring portion, wherein the hinging means 101', 101" at said first end 111 of the rod comprise at least a first roll hinge 101' which has its hinge axis substantially orthogonal to a rolling plane of the two front wheels 10', 10" and is connected to said first anchoring portion 60, wherein said anti-roll system 100 comprises a first blocking device suitable to reversibly block a rotation angle α of said rod 110 with respect to said first roll hinge 101' at said first end 111, said angle of rotation α corresponding to the roll angle of said rod, wherein said first blocking device comprises a kinematic connecting rod-crank 210, 220 which is connected to said rod 110 at the connecting rod 210 by means of a first cylindrical hinge 201, and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101';

said connecting rod 210 being engaged:
- at a first end 210a to the cylindrical articulation hinge 203 or the first cylindrical hinge 201 in an offset position with respect to the respective hinge axis by means of a support bracket 231; and
- at a second end 210b to the first cylindrical hinge 201 or the cylindrical articulation hinge 203 with an axially mobile coupling wherein said first blocking device further comprises:
- an actuator 230 which is suitable to impart an axial shift movement to the connecting rod 210 relative to said first cylindrical hinge 201 or relative to said cylindrical articulation hinge 203 to vary the distance H defined between the cylindrical articulation hinge 203 and the first cylindrical hinge 201, said actuator 230 being operable to vary said distance H by rotating the crank 220 around the second cylindrical hinge 202 and keeping said connecting rod 210 misaligned with respect to the axis between the cylindrical articulation hinge 203 and the second cylindrical hinge 202 so as to vary the configuration of said kinematic connecting rod-crank 210, 220 between a blocked configuration, in which said crank 220 is aligned with respect to the blocking axis passing between the first cylindrical hinge 201 and the second cylindrical hinge 202 and said articulated quadrilateral is substantially degenerated into a triangle thus defining a strut blocking the roll angle of the rod, and at least one free configuration, in which said crank 220 is misaligned with respect to said blocking axis, and said articulated quadrilateral has a non-degenerate configuration which leaves the rolling movements free; and
- stop means 240 suitable to stop the rotation of said crank 220 with respect to said second cylindrical hinge 202 in a position corresponding to said blocked configuration in the passage between said free configuration and said blocked configuration.

Moreover, the method of blocking the rolling movements of a motor vehicle with three or four wheels, having a forecarriage 8 as specified above, comprises, in alternation:

a roll blocking step, in which the crank 220 is rotated around the second cylindrical hinge 202 as far as said blocked configuration where said stop means 240 intervene, actuating the actuator 240 of at least said first blocking device, so as to reduce the distance H defined between the first cylindrical hinge 201 and the cylindrical articulation hinge 203, so as to align crank 220 on the blocking axis defined between the second cylindrical hinge 202 and the first cylindrical hinge 201, degenerating said articulated quadrilateral substantially into a triangle and thus defining a strut blocking the roll angle of the rod; and a roll release step, in which the crank 220 is rotated from said blocked configuration as far as said at least one free configuration disengaging the crank 220 from said stop means 240, actuating the actuator 230 of at least said first blocking device so as to increase the distance H between the first cylindrical hinge 201 and the cylindrical articulation hinge 203, so as to misalign the crank 220 again with respect to said blocking axis, restoring a non-degenerate configuration of said articulated quadrilateral and consequently freeing the roll movements of the two front wheels 10', 10".

Again, according a preferred embodiment, it is provided an anti-roll system of a forecarriage 8 of a rolling motor vehicle with three or four wheels, wherein said forecarriage 8 comprises:

a forecarriage frame 16; and—at least a pair of front wheels 10',10" kinematically connected to each other and to the forecarriage frame 16 by means of a kinematic roll mechanism 20 which enables the same to roll in a synchronous and specular manner, said anti-roll 100 system comprising a rod 110 having a first 111 and a second end 112 opposite each other which is intended—in the installed condition on said forecarriage 8—to connect by means of hinging means 101', 101"; 102', 102" a first 60 and a second anchoring portion 60 of the forecarriage 8 directly to each other, wherein at least one of said first 60 and second anchoring portions 60 is subject to roll movements of said two front wheels 10', 10"

said hinging means 101', 101'; 102', 102" being configured to passively follow the movements of said first and second anchoring portion, wherein the hinging means 101', 101" at said first end 111 of the rod comprise at least a first roll hinge 101' which has its hinge axis substantially orthogonal to a rolling plane of the two front wheels 10', 10" and is connected to said first anchoring portion 60, said anti-roll system 100 comprising a first blocking device suitable to reversibly block a rotation angle α of said rod 110 with respect to said first roll hinge 101' at said first end 111, said angle of rotation α corresponding to the roll angle of said rod, wherein said first blocking device comprises a kinematic connecting rod-crank 210, 220 which is connected to said rod 110 at the connecting rod 210 by means of a first cylindrical hinge 201, and to said first anchoring portion 60 at said crank 220 by means of a second cylindrical hinge 202 so as to define an articulated quadrilateral, said connecting rod 210 being connected to said crank 220 by means of a cylindrical articulation hinge 203, said first 201 and second cylindrical hinge 202 and said cylindrical articulation hinge 203 all having hinge axes parallel to the hinge axis of the first roll hinge 101';

said connecting rod 210 being engaged:

at a first end 210a to the cylindrical articulation hinge 203 or the first cylindrical hinge 201 in an offset position with respect to the respective hinge axis by means of a support bracket 231; and at a second end 210b to the first cylindrical hinge 201 or the cylindrical articulation hinge 203 with an axially mobile coupling wherein said first blocking device further comprises:

an actuator 230 which is suitable to impart an axial shift movement to the connecting rod 210 relative to said first cylindrical hinge 201 or relative to said cylindrical articulation hinge 203 to vary the distance H defined between the cylindrical articulation hinge 203 and the first cylindrical hinge 201, said actuator 230 being operable to vary said distance H by rotating the crank 220 around the second cylindrical hinge 202 and keeping said connecting rod 210 misaligned with respect to the axis between the cylindrical articulation hinge 203 and the second cylindrical hinge 202 so as to vary the configuration of said kinematic connecting rod-crank 210, 220 between a blocked configuration, in which said crank 220 is aligned with respect to the blocking axis passing between the first cylindrical hinge 201 and the second cylindrical hinge 202 and said articulated quadrilateral is substantially degenerated into a triangle thus defining a strut blocking the roll angle of the rod, and at least one free configuration, in which said crank 220 is misaligned with respect to said blocking axis, and said articulated quadrilateral has a non-degenerate configuration which leaves the rolling movements free; and stop means 240 suitable to stop the rotation of said crank 220 with respect to said second cylindrical hinge 202 in a position corresponding to said blocked configuration in the passage between said free configuration and said blocked configuration.

The invention thus conceived thus achieves the intended purposes.

Of course, it may take, in its practical embodiment, also shapes and configurations other than the above without departing from the present scope of protection.

Furthermore, all details may be replaced with technically equivalent elements and dimensions, shapes and materials used may be any according to the needs.

The invention claimed is:

1. Forecarriage of a rolling motor vehicle with three or four wheels, comprising:

a forecarriage frame, at least a pair of front wheels kinematically connected to each other and to the forecarriage frame by a kinematic roll mechanism, an anti-roll system comprising a connecting rod having a first and a second end opposite each other which connect by hinging means a first and second anchoring portion of the forecarriage directly to each other, wherein at least one of said first and second anchoring portions is subject to roll movements of said two front wheels, said anti-roll system comprising a first blocking device suitable to reversibly block a rotation angle of said connecting rod, said angle of rotation corresponding to the roll angle of said connecting rod, wherein said first blocking device comprises a kinematic connecting rod-crank which is respectively connected to said connecting rod, and to said first anchoring portion so as to define an articulated quadrilateral, wherein said kinematic connecting rod-crank comprises a kinematic rod and a kinematic crank;

and wherein said first blocking device further comprises:

an actuator which is suitable to impart a shift movement to said kinematic connecting rod-crank so as to vary the configuration of said kinematic connecting rod-crank between a blocked configuration, in which said articulated quadrilateral is substantially degenerated into a triangle thus defining a strut blocking the roll angle of the connecting rod, and at least one free configuration, in which said articulated quadrilateral has a non-degenerate configuration which leaves the rolling movements free; and stop means suitable to stop the rotation of said kinematic crank in a position corresponding to said blocked configuration in the passage between said free configuration and said blocked configuration.

2. Forecarriage according to claim 1, wherein said kinematic connecting rod-crank is connected to said connecting rod at the kinematic rod by a first cylindrical hinge, and to said first anchoring portion at said kinematic crank by a second cylindrical hinge, and wherein said kinematic rod is connected to said kinematic crank by a cylindrical articulation hinge, said first and second cylindrical hinge and cylindrical articulation hinge all having hinge axes parallel to the hinge axis of the first roll hinge.

3. Forecarriage according to claim 2, wherein said kinematic rod is engaged:

at a first end to the cylindrical articulation hinge or the first cylindrical hinge in an offset position with respect to the respective hinge axis by a support bracket; and at a second end to the first cylindrical hinge or the cylindrical articulation hinge with an axially mobile coupling.

4. Forecarriage according to claim 2, wherein said actuator is suitable to impart an axial shift movement to the kinematic rod relative to said first cylindrical hinge or relative to said cylindrical articulation hinge to vary the distance defined between the cylindrical articulation hinge and the first cylindrical hinge, said actuator being operable to vary said distance by rotating the kinematic crank around the second cylindrical hinge and keeping said kinematic rod misaligned with respect to the axis between the cylindrical articulation hinge and the second cylindrical hinge.

5. Forecarriage according to claim 2, wherein in the blocked configuration said kinematic crank is aligned with respect to the blocking axis passing between the first cylindrical hinge and the second cylindrical hinge and in the free configuration said kinematic crank is misaligned with respect to said blocking axis.

6. Forecarriage according to claim 2, wherein said kinematic rod comprises a worm screw which is rotationally meshed on a support body of said first cylindrical hinge or of said cylindrical articulation hinge, said actuator being suitable to impart to said worm screw a rotation movement on its axis that determines an axial shift of the kinematic rod relative to said first cylindrical hinge or relative to said cylindrical articulation hinge.

7. Forecarriage according to claim 6, wherein said worm screw is rotationally meshed on the support body of said first cylindrical hinge with its second end portion and is connected to said cylindrical articulation hinge at its first end portion indirectly by a support bracket which is configured to keep said worm screw offset with respect to said cylindrical articulation hinge.

8. Forecarriage according to claim 2, wherein the hinging means at said second end of the connecting rod comprise at least a second roll hinge which has its own hinge axis substantially orthogonal to said rolling plane of the two front wheels and is connected to said second anchoring portion and wherein said anti-roll system comprises a second blocking device suitable to reversibly block the rotation angle of said connecting rod at said second end, wherein said second blocking device is identical to said first blocking device placed in said first end.

9. Forecarriage according to claim 1, wherein said stop means comprises a mechanical end stroke element.

10. Forecarriage according to claim 9, wherein said kinematic connecting rod-crank is connected to said connecting rod by a first cylindrical hinge, and to said first anchoring portion by a second cylindrical hinge, and wherein said kinematic rod is connected to said kinematic crank by a cylindrical articulation hinge, said first and second cylindrical hinge and said cylindrical articulation hinge all having hinge axes parallel to the hinge axis of the first roll hinge and wherein said mechanical end stroke compriese a Fairbairn mechanism which diagonally connects said first cylindrical hinge and said second cylindrical hinge and is axially slidable with respect to said first cylindrical hinge via a longitudinal slot connection so as to permit sliding along the axis between said first and second cylindrical hinge, said Fairbairn mechanism defining an engagement seat for the cylindrical articulation hinge, wherein said engagement seat is axially aligned between the first and the second cylindrical hinge.

11. Forecarriage according to claim 1, wherein said kinematic crank comprises a damper arranged along the axis of the kinematic crank, suitable to determine a non-abrupt blocking of the roll when the kinematic connecting rod-crank is brought into the blocked configuration, and wherein stop means of said damper are provided, suitable to deactivate said damper preventing oscillations along the axis of the crank and to determine a static block.

12. Forecarriage according to claim 1, wherein said connecting rod is extensible in the longitudinal direction between said first and second end.

13. Forecarriage according to claim 1, wherein each of said two front wheels is connected to said kinematic roll mechanism by a respective axle journal, the latter being mechanically connected to a rotation pin of the wheel so as to support it rotatably around an axis of rotation, said forecarriage comprising suspension means to guarantee each axle journal at least one spring suspension movement with respect to said rolling kinematic mechanism.

14. Forecarriage according to claim 1, wherein said kinematic rolling mechanism comprises: a pair of cross members, hinged to the forecarriage frame at median hinges; a pair of uprights, which are pivoted at opposite ends of said cross members at side hinges, wherein said pair of cross members and said pair of uprights define an articulated quadrilateral kinematic mechanism.

15. Motor vehicle having a drive wheel at the rear and a forecarriage according to claim 1.

16. Method of blocking the rolling movements of a motor vehicle with three or four wheels, having a forecarriage according to claim 1, said method alternately comprising:

a roll blocking step, in which the kinematic crank is rotated actuating the actuator of at least said first blocking device as far as said blocked configuration where said stop means intervene, degenerating said articulated quadrilateral substantially into a triangle and thus defining a strut blocking the roll angle of the connecting rod; and a roll release step, in which the kinematic crank is rotated actuating the actuator of at least said first blocking device from said blocked configuration as far as said at least one free configuration disengaging the kinematic crank from said stop means, restoring a non-degenerate configuration of said articulated quadrilateral and consequently freeing the roll movements of the two front wheels.

17. Anti-roll system of a forecarriage of a rolling motor vehicle with three or four wheels, wherein said forecarriage comprises:

a forecarriage frame; and at least a pair of front wheels kinematically connected to each other and to the forecarriage frame by a kinematic roll mechanism, said anti-roll system comprising a connecting rod having a first and a second end opposite each other which is intended, in the installed condition on said forecarriage, to connect by hinging means a first and a second anchoring portion of the forecarriage directly to each other, wherein at least one of said first and second anchoring portions is subject to roll movements of said two front wheels, said anti-roll system comprising a first blocking device suitable to reversibly block a rotation angle of said connecting rod, said angle of rotation corresponding to the roll angle of said connecting rod, wherein said first blocking device comprises a kinematic connecting rod-crank which is connected to said connecting rod, and to said first anchoring portion so as to define an articulated quadrilateral, wherein said kinematic connecting rod-crank comprises a kinematic rod and a kinematic crank;

and wherein said first blocking device further comprises:

an actuator which is suitable to impart a shift movement to said kinematic connecting rod-crank so as to vary the configuration of said kinematic connecting rod-crank between a blocked configuration, in which said articulated quadrilateral is substantially degenerated into a triangle thus defining a strut blocking the roll angle of the connecting rod, and at least one free configuration, in which said articulated quadrilateral has a non-degenerate configuration which leaves the rolling movements free; and stop means suitable to stop the rotation of said kinematic crank in a position corresponding to said blocked configuration in the passage between said free configuration and said blocked configuration.

* * * * *